(12) United States Patent
Yangpichit (10) Patent No.: US 8,534,068 B2
(45) Date of Patent: Sep. 17, 2013

(54) SOLAR CHIMNEY WITH WIND TURBINE

(76) Inventor: Pitaya Yangpichit, Bangkok (TH)

(*) Notice: Subject to any disclaimer, the term of this patent is extended or adjusted under 35 U.S.C. 154(b) by 917 days.

(21) Appl. No.: 12/688,116

(22) Filed: Jan. 15, 2010

(65) Prior Publication Data

US 2011/0173980 A1  Jul. 21, 2011

(51) Int. Cl.
*F03G 6/00* (2006.01)
(52) U.S. Cl.
USPC .......... 60/641.12; 60/641.13; 290/44; 290/55
(58) Field of Classification Search
USPC .. 60/641.8, 641.11–641.15, 650; 290/43–44, 290/54–55
See application file for complete search history.

(56) References Cited

U.S. PATENT DOCUMENTS

| | | | |
|---|---|---|---|
| 2,112,087 A | 3/1938 | Golod | |
| 2,552,237 A | 5/1951 | Trombe | |
| 2,902,028 A | 9/1959 | Manly | |
| 3,203,167 A | 8/1965 | Green | |
| 3,869,199 A | 3/1975 | Cummings | |
| 3,979,597 A * | 9/1976 | Drucker | 290/55 |
| 4,016,725 A * | 4/1977 | Fiss | 60/690 |
| 4,026,273 A | 5/1977 | Parker | |
| 4,052,134 A | 10/1977 | Rumsey | |
| 4,090,494 A | 5/1978 | Borst | |
| 4,096,698 A | 6/1978 | Martin | |
| 4,154,220 A | 5/1979 | Loth | |
| 4,275,309 A | 6/1981 | Lucier | |
| 4,331,042 A | 5/1982 | Anderson | |
| 4,388,533 A | 6/1983 | Campbell | |
| 4,421,159 A | 12/1983 | Lin | |
| 4,433,544 A | 2/1984 | Wells | |
| 4,434,787 A | 3/1984 | Young | |
| 4,449,515 A | 5/1984 | Nilsson | |
| 4,453,383 A | 6/1984 | Collins | |
| 4,467,788 A | 8/1984 | Peranio | |
| 4,534,335 A | 8/1985 | Rice | |
| 4,706,471 A | 11/1987 | Alexander | |
| 4,723,535 A | 2/1988 | Lew | |

(Continued)

FOREIGN PATENT DOCUMENTS

| | | |
|---|---|---|
| DE | 2521588 A1 | 12/1976 |
| DE | 3312977 A1 | 10/1984 |

(Continued)

OTHER PUBLICATIONS

U.S. Department of Energy, "CSP Technologies Overview", www.energylan.sandia.gov/sunlab/overview.htm (7 pages).

(Continued)

*Primary Examiner* — Hoang Nguyen
(74) *Attorney, Agent, or Firm* — William H. Eilberg (57) ABSTRACT

A solar chimney includes an elongated chamber having the general configuration of an hourglass. The chamber includes one or more heat exchangers for heating air in the chamber by solar energy. A turbine in the chamber is driven by updrafts of air created in the chamber, and the turbine drives an electric generator or other machine. An exhaust wind turbine assists in the production of such updrafts. A vertical axis wind turbine harnesses energy of wind in the environment of the chimney, and such energy is used to drive the exhaust wind turbine. Excess wind energy is stored for later use. A set of extendable and retractable vanes, mounted externally of the chimney, deflects wind, in the environment of the chimney, towards the vertical axis wind turbine.

14 Claims, 5 Drawing Sheets

(56) References Cited

U.S. PATENT DOCUMENTS

| | | | |
|---|---|---|---|
| 4,790,477 | A | 12/1988 | Forkin |
| 4,830,677 | A | 5/1989 | Geisler |
| 5,224,466 | A | 7/1993 | Kirchmayer |
| 5,381,048 | A | 1/1995 | Baird |
| 5,983,634 | A | 11/1999 | Drucker |
| 6,016,015 | A | 1/2000 | Willard |
| 6,089,021 | A | 7/2000 | Senanayake |
| 6,590,300 | B1 * | 7/2003 | Preito Santiago ............. 290/55 |
| 6,772,593 | B2 | 8/2004 | Dunn |
| 7,026,723 | B2 | 4/2006 | Moreno |
| 7,821,151 | B2 * | 10/2010 | Le et al. ........................ 290/55 |
| 2003/0217551 | A1 | 11/2003 | Drucker |
| 2004/0237524 | A1 | 12/2004 | Thiagarajan |
| 2005/0061312 | A1 | 3/2005 | Szymocha |
| 2008/0156315 | A1 | 7/2008 | Yangpichit |
| 2008/0314058 | A1 | 12/2008 | Jones |
| 2009/0212570 | A1 | 8/2009 | Le |

FOREIGN PATENT DOCUMENTS

| | | | |
|---|---|---|---|
| DE | 19821659 | A1 | 11/1999 |
| DE | 10023424 | A1 | 11/2001 |
| DE | 10343544 | A1 | 4/2005 |
| EP | 0017105 | A1 | 10/1980 |
| EP | 1589221 | A2 | 10/2005 |
| EP | 1741927 | A1 | 1/2007 |
| EP | 1830061 | A2 | 9/2007 |
| FR | 2363711 | A1 | 3/1978 |
| FR | 2574863 | A1 | 6/1986 |
| FR | 2683864 | A1 | 5/1993 |
| FR | 2725501 | A3 | 4/1996 |
| FR | 2844561 | A1 | 9/2002 |
| FR | 2848616 | A1 | 6/2004 |
| GB | 1549452 | A | 8/1979 |
| GB | 2062107 | A | 5/1981 |
| JP | 57005570 | | 1/1982 |
| JP | 57169550 | A | 10/1982 |
| JP | 2004100496 | A | 4/2004 |
| WO | 2004/036039 | A1 | 4/2004 |
| WO | 2005/100878 | A1 | 10/2005 |
| WO | 2005/103581 | A1 | 11/2005 |
| WO | 2006/098662 | A2 | 9/2006 |
| WO | 2008113124 | A2 | 9/2008 |

OTHER PUBLICATIONS

Schlaich et al, "Solar Chimneys", Encyclopedia of Physical Science and Technology, 3rd ed. 2000 (11 pages).

U.S. Department of Energy, "Solar Power Tower", www.energylan.sandia.gov/sunlab/PDFs/solar_tower.pdf (pp. 5-6 through 5-23).

U.S. Department of Energy, "Solar Parabolic Trough", www.energylan.sandia.gov/sunlab/PDFs/solar_trough.pdf (pp. 5-24 through 5-44).

* cited by examiner

SOLAR CHIMNEY WITH WIND TURBINE

BACKGROUND OF THE INVENTION

This invention relates to the production of electric power, or other useful work, from solar energy.

In a solar chimney, energy from the sun heats the air in an elongated, enclosed vertical structure, so as to create an updraft in the structure. The moving air can then be used to drive a turbine to produce electric power, or it can be made to perform other useful work.

Examples of solar chimneys, as shown in the prior art, are given in U.S. Pat. Nos. 3,979,597, 4,275,309, 4,331,042, 4,433,544, 5,381,048, 6,016,015, 6,089,021, 6,772,593, and 7,026,723, and in U.S. Patent Application Publication Nos. 20080156315, 20080156316, 20080156317, and 20080156318, the disclosures of all of which are incorporated by reference herein.

The present invention provides improvements over the solar chimneys of the prior art. The solar chimney of the present invention is shaped advantageously to reduce losses due to friction caused by the updrafts flowing in the chimney. The present invention also provides means for harnessing the energy of wind in the environment of the chimney, wherein such energy can be used to assist in drawing air through the interior of the chimney.

SUMMARY OF THE INVENTION

The solar chimney of the present invention comprises an elongated chamber having an inlet end and an outlet end, the chamber defining a path for fluid, such as air, from the inlet to the outlet. Air updrafts in the chamber drive an internal turbine which is connected to an electric generator, or to some other machine.

The chamber has the general configuration of an hourglass; the diameter of the chamber becomes progressively smaller with distance from the inlet end, until the diameter reaches a minimum value. The diameter then becomes progressively larger, as one proceeds towards the outlet end.

Disposed within the chamber are one or more means for heating air in the chamber by solar energy. In particular, there may be a solar collector inside the chamber which receives direct solar radiation from outside the chamber. The solar collector may also be configured to function as a heat exchanger. There may also be a heat exchanger, located inside the chamber, wherein the heat exchanger receives heat energy transferred from a solar collector located outside the chamber. Either or both of the above alternatives may be present in the solar chimney of the present invention.

The solar chimney preferably includes an exhaust wind turbine, located at or near the outlet end of the chamber. The exhaust wind turbine is configured to draw air from the inlet end to the outlet end of the chamber, and therefore assists in creating an updraft in the chamber.

The solar chimney also preferably includes a vertical axis wind turbine, mounted for rotation relative to the solar chimney. The vertical axis wind turbine captures energy of wind in the surrounding environment. This wind energy is used to drive an air compressor, and the compressed air is then used to drive an air motor which operates the exhaust wind turbine. To the extent that more compressed air is created than is needed, the compressed air is stored in a storage vessel for later use.

A set of vanes is disposed around the outside of the solar chimney, somewhat below the vertical axis wind turbine. These vanes are extendable and retractable, in a manner analogous to the opening and closing of an umbrella. The vanes deflect some of the wind, flowing in the outside environment of the chimney, towards the vertical axis wind turbine.

The present invention therefore has the primary object of providing a solar chimney, in which solar energy heats air in the chimney, causing updrafts which can be harnessed to perform useful work.

The invention has the further object of providing a solar chimney in which an exhaust wind turbine assists in the production of updrafts in the chimney.

The invention has the further object of providing a solar chimney in which a vertical axis wind turbine, external to the chimney, harnesses energy of wind in the environment of the chimney, wherein such energy is used to drive the exhaust wind turbine.

The invention has the further object of improving the efficiency of a solar chimney.

The invention has the further object of providing an improved device for harnessing the energy of the sun to do useful work.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
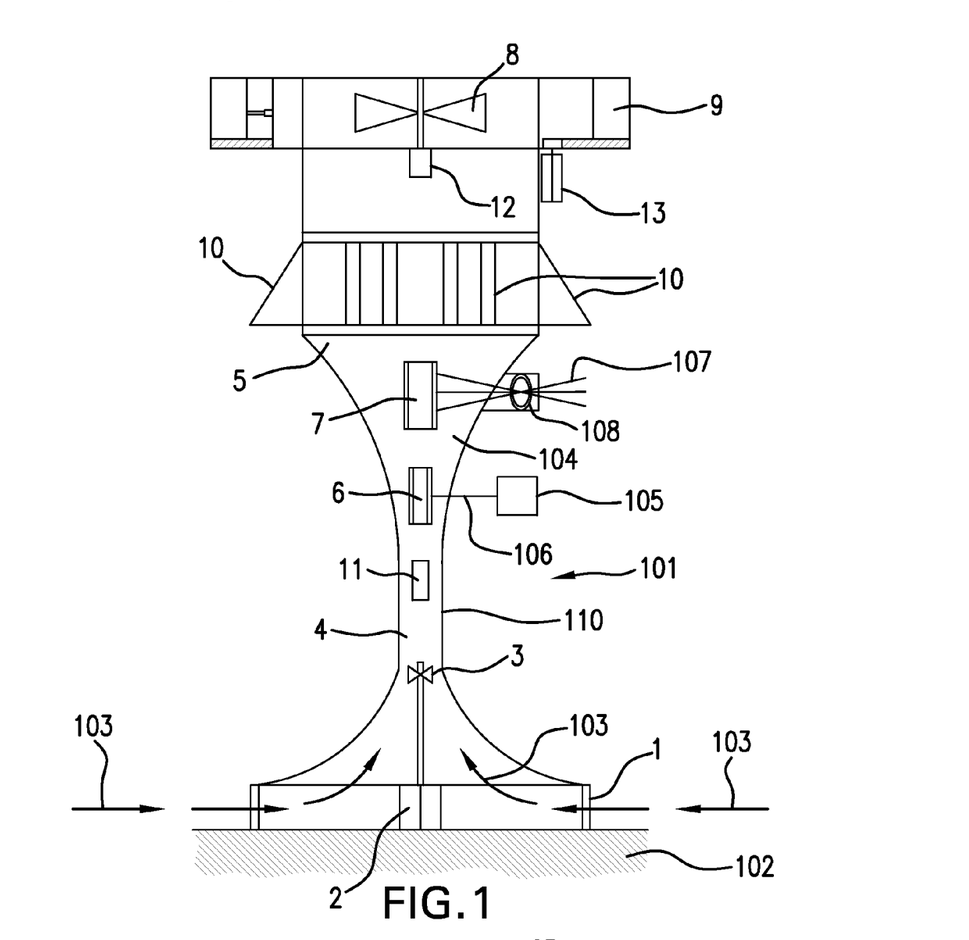
FIG. 1 provides a side elevational view, partly in schematic form, showing the solar chimney of the present invention.

FIG. 1 provides a side elevational view, partly in schematic form, of the solar chimney of the present invention. The solar chimney 101 is mounted on the ground 102. The solar chimney includes base 1 which rests on the ground, or is rigidly affixed to the ground. The base includes appropriate openings which allow ambient air to flow into the base, and upward through the solar chimney, as indicated by arrows 103.

The air flowing upward through the solar chimney drives turbine 3, which is connected to gear box and electric generator 2. The turbine and generator are not necessarily shown to scale. The gear box and generator may be mounted inside or near the base. The gear box contains gears (not shown) which connect the turbine 3 to the generator. The generator could be replaced by some other machine which requires an input of mechanical energy.

As shown in FIG. 1, the solar chimney of the present invention has the general configuration of an hourglass. That is, the diameter of the solar chimney decreases to a narrow throat portion 4, and then increases as one proceeds upward.

The solar chimney therefore comprises an elongated chamber 110 having an inlet, near the bottom of FIG. 1, and an outlet, at the top of FIG. 1, the chamber defining a path for fluid, such as air, from the inlet to the outlet.

Air at ambient temperature, sucked into the chimney by the updraft within the chimney, flows smoothly upward, with increasing speed, towards the throat 4, due to the venturi effect caused by the decreasing diameter. The throat comprises the most narrow portion of the solar chimney.

Air exiting the area of throat 4 is heated by heat exchangers disposed at or above the throat (these exchangers being described below). The heated air expands, and the increase in volume of the air is proportional to the increase in its temperature.

In a solar chimney of the prior art, in which the diameter is constant throughout its entire length, the heated air would be forced to flow faster, due to its increased volume. The faster the flow, the greater the friction loss due to such flow. But in the present invention, the heated air encounters a region 104 of increasing diameter. Thus, the hourglass shape of the present invention compensates, at least in part, for the increase in volume of the heated air, and offsets the tendency of the heated air to increase in speed. Thus, the structure of the present invention reduces frictional losses due to air flow. Flow velocity of the air either remains constant, or increases at a relatively slow rate, as compared with a chimney in which the diameter is constant throughout its length.

The air in the solar chimney is heated by heat exchangers 6 and 7. The heat exchangers comprise means for heating the air in the chimney by solar energy. Heat exchanger 6 is connected, by suitable heat transfer conduits symbolized by line 106, to external solar collector 105. Heat exchanger 7 receives solar energy (symbolized by lines 107) which is focused by lens 108, and which passes through an opening in the wall of the solar chimney, and impinges on heat exchanger 7. That is, item 7 is a combined heat exchanger and internal solar collector. The structure of the heat exchangers and solar collectors may be the same as described in detail in U.S. Patent Application Publication No. 20080156315, cited above, or they may have other configurations.

Auxiliary burner 11 is a conventional (i.e. non-solar) heat source, which is used in the event that there is insufficient solar energy on a given day. The burner 11 could be a gas burner, or some other conventional heat source, which heats the air in the chimney instead of the solar collectors/heat exchangers 6 and 7.

The movement of air through the solar chimney of the present invention is aided, directly or indirectly, by two distinct turbines. These are exhaust wind turbine 8 and vertical axis wind turbine 9.

Exhaust wind turbine 8 helps to move convected air through the solar chimney. Thus, the solar chimney of the present invention does not rely exclusively on convection to provide the necessary updrafts. Instead, the exhaust wind turbine 8 provides additional suction which tends to pull air upward within the chimney.

The exhaust wind turbine is powered indirectly by wind energy captured by vertical axis wind turbine 9, which will be described later. Captured wind energy is used to drive compressor 13, which produces compressed air. The compressed air powers air motor 12, which drives exhaust wind turbine 8. Regulation of the exhaust wind turbine is accomplished by a system of pressure/flow controllers and storage vessels, to be described later. Compressed air produced by wind energy, in excess of the requirement to drive the exhaust wind turbine, is stored and discharged under controlled pressure, as will be described in more detail later.

The vertical axis wind turbine 9 is positioned externally of the chimney, and near the top of the chimney. The vertical axis wind turbine 9 is located above vanes or flaps 10. The vertical axis wind turbine 9, which will be described in more detail later, has the general shape of an annular cylindrical cage, which is attached concentrically to the chimney.

The entire annular cylindrical cage can rotate freely around the chimney, similar to the rotation of a carousel. Within the annular cylindrical cage, between its inner and outer rings, are affixed vanes or blades. The vanes or blades extract energy from wind blowing across the chimney, thereby rotating the annular cylindrical cage.

The vertical axis wind turbine 9 and the exhaust wind turbine 8 are independent of each other, in the sense that rotation of turbine 9 does not immediately cause rotation of turbine 8. Instead, rotation of turbine 9 causes energy to be stored which can later be used to drive turbine 8. It is turbine 8 which provides additional suction, or negative pressure, for air flowing upwardly through the chimney. It is turbine 9 which captures energy of wind flowing horizontally, or generally horizontally, outside the chimney, such energy being used either immediately or stored for later use.

The solar chimney 101 includes vanes or flaps 10 which together comprise a conical structure which deflects air towards the vertical axis wind turbine 9. The chimney 101 and vanes or flaps 10 together form a structure which is analogous to that of an umbrella, with the chimney corresponding to the shaft of the umbrella, and the vanes or flaps 10 corresponding to the canopy of the umbrella. When the vanes or flaps 10 are fully extended, they form a canopy or skirt surrounding the chimney.

The vanes 10 are therefore hinged so that they can be extended fully, as shown in FIG. 1, or retracted, such that they are generally coincident with the side wall of the solar chimney. When the vanes 10 are extended, wind that would otherwise impact the side of the solar chimney is deflected upward. The deflected wind combines with the wind flowing across the top of the solar chimney, and results in a large increase in wind speed. This wind energy can be captured by the vertical axis wind turbine.

In the event of a storm, the vanes 10 can be protected by retracting them, in a manner similar to folding an umbrella.

The vanes 10 could also be constructed in a manner similar to a weather vane, with the front pointing in the direction of the wind.

Figure 2:
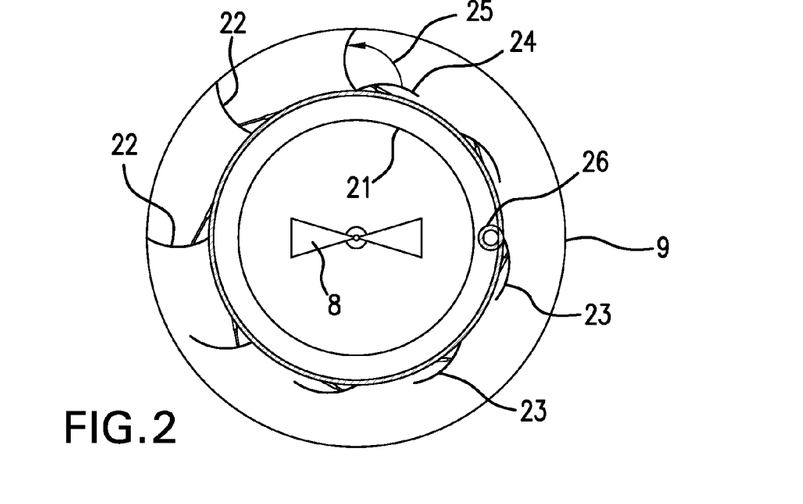
FIG. 2 provides a top view of the solar chimney of FIG. 1.

FIG. 2 provides a top view of the solar chimney of FIG. 1. The outer circle is the outer ring of the annular cylindrical cage which defines the vertical axis wind turbine. The inner circle 21 corresponds to the wall 5 of the solar chimney. FIG. 2 also shows vanes 22 of the vertical axis wind turbine. The vanes 22 are therefore not the same as the vanes or flaps 10. The vanes 22 are shown in various positions. Vanes 22 are open, and vanes 23 are closed. Vane 24 is shown being flipped open, in the direction indicated by arrow 25. Reference numeral 26 identifies a gear, driven by the vertical axis wind turbine, the gear being connected to the air compressor 13.

Figure 3:
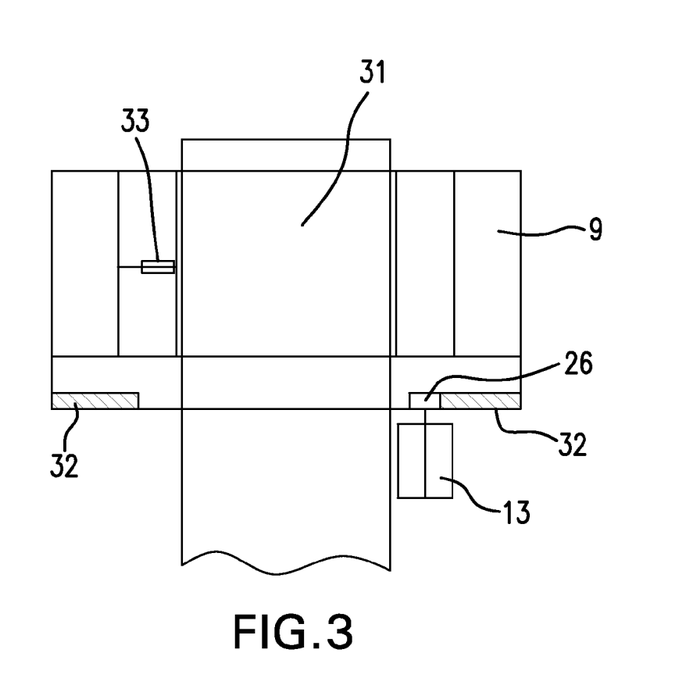
FIG. 3 provides a side elevational view of the vertical axis wind turbine, and a fragment of the chimney portion, of the present invention.

FIG. 3 shows a detail of the vertical axis wind turbine 9 and the top of the solar chimney. The details of FIG. 3, and corresponding items in FIG. 1, are not drawn to scale, but are illustrated in exaggerated form for purposes of explanation.

The top portion of the chimney is indicated by reference numeral 31. Annular gear 32 moves with the vertical axis wind turbine, and engages gear 26, which rotates the air compressor 13. A shock absorber 33 couples the vane to the annular cylindrical cage, modulating the opening and closing of the vane. More details of this structure are given in FIG. 5, described below, in which the shock absorber is shown as element 54.

Figure 4:
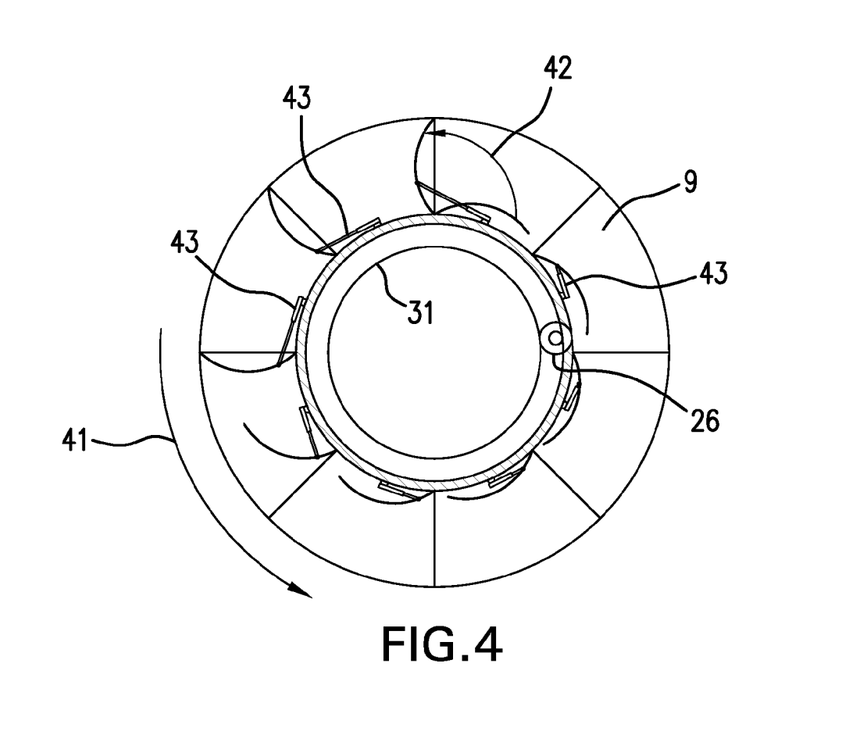
FIG. 4 provides a top view of the vertical axis wind turbine of the present invention, showing the vanes of the turbine in their extended and retracted positions.

FIG. 4 provides a top view showing the vertical axis wind turbine and the chimney only. Note that the direction of wind, blowing in the environment outside the chimney, is generally horizontal, and therefore is parallel to the plane of the paper in FIG. 4. The vertical axis wind turbine 9 is shown rotating around chimney 31, as indicated by arrow 41. The figure shows the various vanes in open and closed positions, and shows one vane being flipped from closed to open, as indicated by arrow 42. The vanes are connected to shock absorbers 43, to prevent the vanes from being suddenly jerked out too quickly due to the effect of wind. The vanes can be made of a rigid material, or they can be made of a flexible membrane.

In addition to retracting and extending, the vanes could also be constructed to move in other directions, so as to assume the most advantageous orientation relative to the wind.

The vanes could also be constructed with a different shape from what is shown in the drawings, so as to obtain the highest possible efficiency.

Suppose that the wind is blowing from the top towards the bottom, generally in the plane of the paper, in FIG. 4. Then the vanes on the right-hand side will retract, because the wind is blowing in a direction so as to close the vanes. The vanes on the left-hand side will extend, because the wind is blowing so as to open these vanes. The vanes should be positioned to reduce drag on the right-hand side, where the wind is blowing over the convex side of the vanes, and to increase drag on the left-hand side, where the concave side of the vanes catches the wind.

Thus, the vanes of the vertical axis wind turbine open and close repeatedly, subject to the dampening effect of the shock absorbers, according to the instantaneous direction in which the wind is blowing relative to each vane. The opening and closing of the vanes occurs automatically, as a result of the positioning of the turbine relative to the wind.

Figure 5:
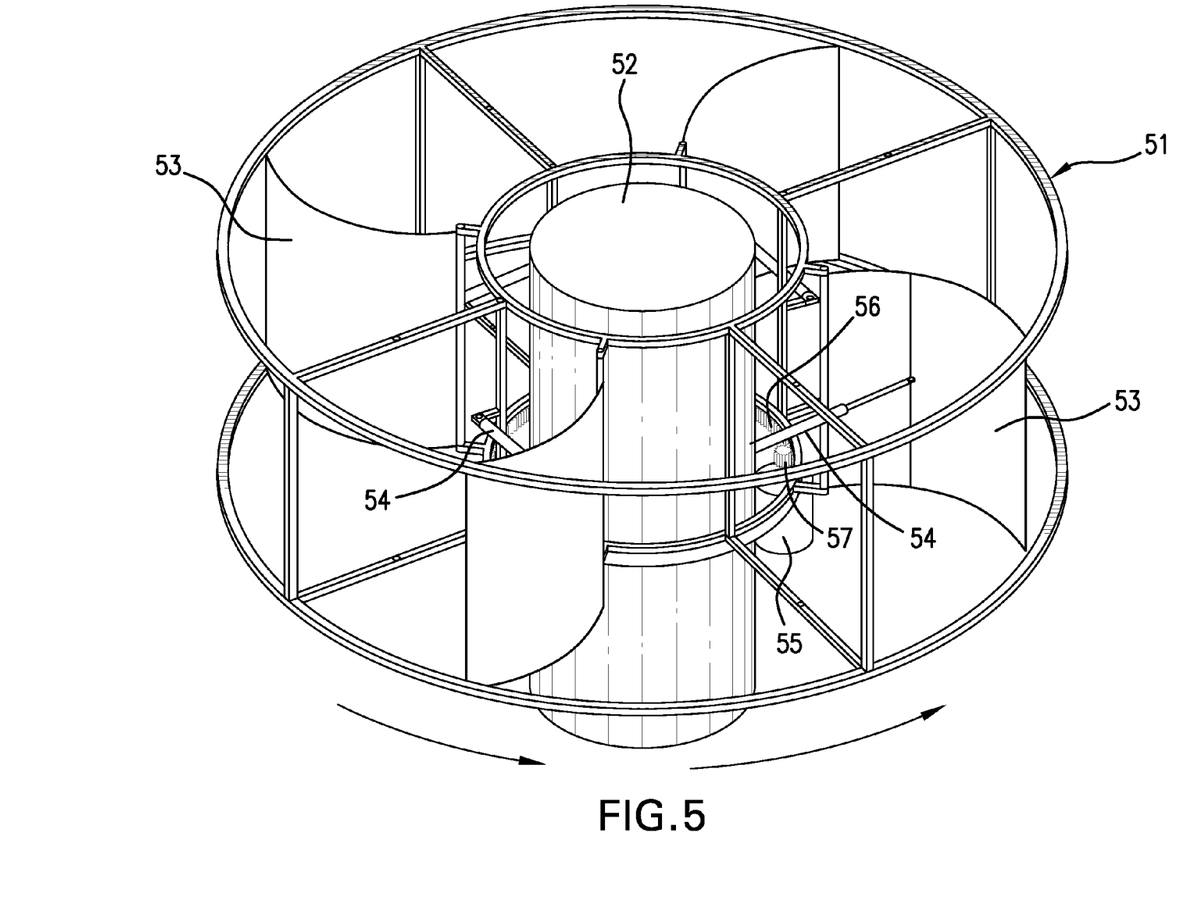
FIG. 5 provides a perspective view of the vertical axis wind turbine of the present invention.

FIG. 5 provides a perspective view of the vertical axis wind turbine. FIG. 5 is intended to show the same component as described earlier, but with more detail. In FIG. 5, turbine 51 is mounted for rotation around the top portion 52 of the solar chimney. Vanes 53 open and close, subject to the effect of shock absorbers 54. Also visible is the gearing arrangement by which motion of the turbine is transmitted to air compressor 55. FIG. 5 shows annular gear 56, engaged with gear 57 which connects to air compressor 55. The compressor is stationary and is attached to the wall of the solar chimney. Rollers can be used instead of gears, for power transmission.

Compressed air produced in the compressor (such as item 55 of FIG. 5 or item 13 of FIG. 1) drives the air motor 12, which drives the exhaust wind turbine 8. The air motor is controlled by regulating the flow or pressure of compressed air entering the motor.

Figure 6:
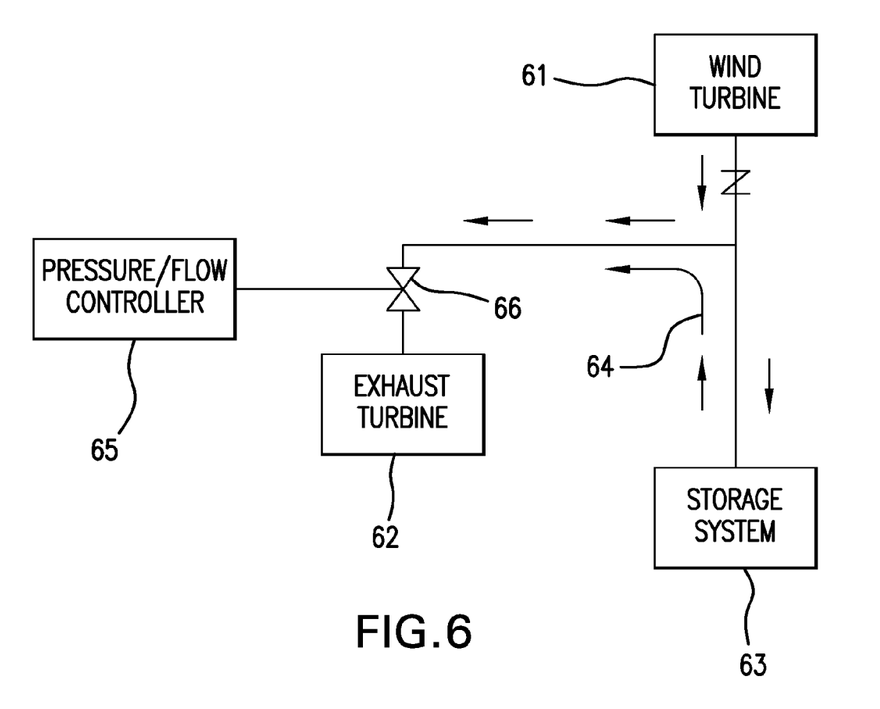
FIG. 6 provides a block diagram illustrating the interconnection of various components of the present invention.

FIG. 6 provides a block and schematic diagram illustrating the flow of compressed air, its storage, and its regulation. Compressed air produced by the wind turbine 61 is used solely for powering the exhaust wind turbine 62, subject to pressure/flow controller 65. Block 61 is intended to represent both the vertical axis wind turbine and the air compressor driven by such turbine. Excess production of compressed air, beyond the requirement of the air motor, is stored under pressure, in storage system 63. If there is a shortfall in production of compressed air, the system automatically allows stored compressed air to blow back into the system, as indicated by arrows 64, to make up the deficit.

Of the three major components shown in FIG. 6, namely the wind turbine/air compressor, the exhaust turbine, and the storage system, the air compressor operates at the highest pressure, followed by the storage system. The device of lowest pressure is the air motor which powers the exhaust wind turbine.

Air flows naturally to the area with the lowest pressure, namely the air motor powering the exhaust wind turbine. When the production of compressed air is in excess of the requirement of the air motor, the pressure/flow controller closes the inlet valve 66. The pressure in the system then rises. The increase in pressure enables air to flow to a location of higher pressure, namely the storage vessel, and the reverse is true when there is a shortfall of production of compressed air. As the pressure of the air in storage is relatively constant, the free flow into and out of storage, without mechanical means, is feasible.

Figure 7A:
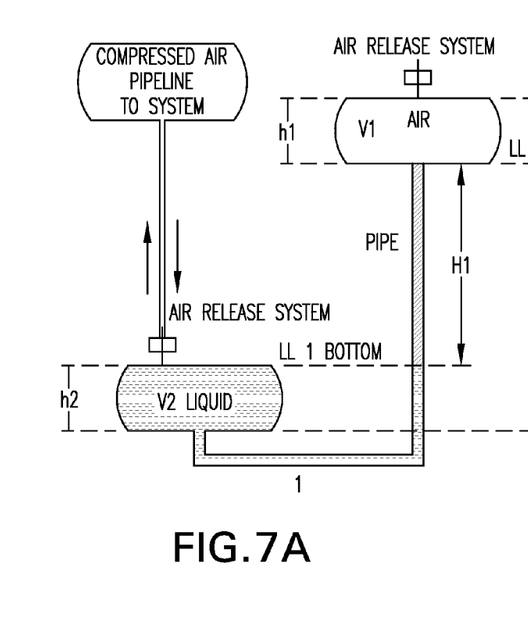
FIGS. 7A-7C provide schematic diagrams showing the storage of energy by the system of the present invention.
Figure 7B:
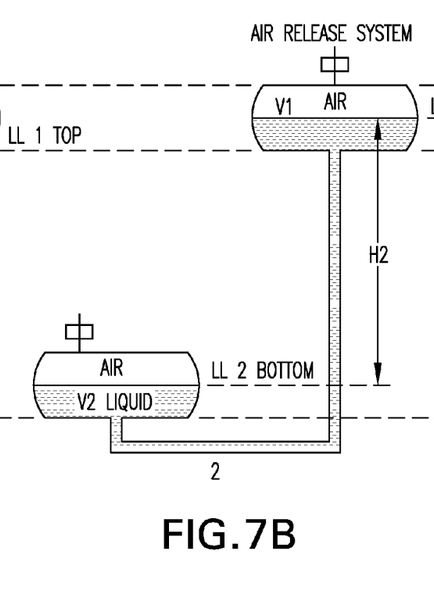
Figure 7C:
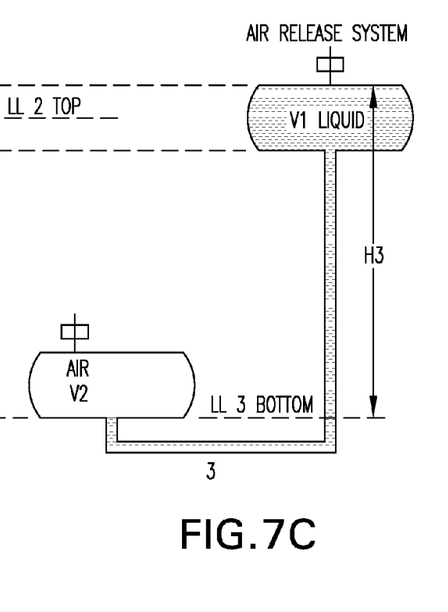

FIGS. 7A-7C illustrate the operation of the storage system of the present invention. The storage system comprises vessels V1 and V2, wherein vessel V2 is connected, by a suitable conduit, to the compressed air pipeline to the system. The dashed lines identify various reference levels of interest, and enable proper comparison of the three figures.

The pressure exerted by a column of liquid is determined by the height of the column and its density. Vessels V1 and V2 are vessels having the same diameter. Vessel V1 can be an open tank, but vessel V2 must be a closed pressure vessel.

Vessels V1 and V2 are located at different elevations, with V1 higher than V2. Vessels V1 and V2 may both be above ground, or one may be above ground and the other below, or both may be below ground.

Vessels V1 and V2 are connected at the bottom by a pipe which allows the free flow of liquid between the two vessels. Liquid is prevented from escaping from the top of vessel V1, and from vessel V2, by an air release system. Air can flow in and out of vessels V1 and V2. The liquid level is indicated by "LL".

The three FIGS. 7A-7C represent three cases, which are discussed below.

Case 1 (FIG. 7A)

Vessel V1 is empty, and vessel V2 is full. The pipe is filled with liquid, up to the inlet at the bottom of vessel V1. Vessel V2 is now subject to a pressure of H1, which is the pressure exerted by a column of liquid of height H1, multiplied by its density. H1 is the difference in liquid level between the two vessels.

Case 2 (FIG. 7B)

Air having a pressure greater than H1 flows into vessel V2, displacing an equal volume of liquid. The displaced liquid flows up into vessel V1, filling it to height LL2 Top. The liquid level in vessel V2 is now at LL2 bottom. The air pressure in the system is now at H2.

Case 3 (FIG. 7C)

A further increase in the pressure of the system displaces even more liquid. The difference in liquid level between vessel V1 and vessel V2 is H3. The air pressure of the system now equals H3.

Air is subjected to pressure H1 in Case 1, to pressure H2 in Case 2, and to pressure H3 in Case 3. From the drawings, is apparent that $$H2 = H1 + h2$$

$$H3 = H1 + h2 + h1$$

The pressure variation in the system ranges between H1 and H1+h2+h1. If H is the elevational difference between the locations of vessels V1 and V2, and if H is large in comparison to h1+h2, the pressure variation of the system will be small. Therefore, regardless of the volume of air in vessel V2, the filling and discharging will be at a relatively constant pressure. This allows the free flow of compressed air into and out of the storage system, without the need for mechanical equipment such as pumps.

The invention can be modified in various ways. For example, the electric generator, driven by turbine 3, can be replaced by some other machine which requires mechanical energy for its operation.

Also, the energy from the vertical axis wind turbine can be harnessed in other ways. For example, the vertical axis wind turbine could be connected to an electric generator, and a storage battery, so that the stored electrical energy could operate the exhaust wind turbine and/or other components. Such stored electrical energy could also drive a motor which operates the vanes or flaps 10.

The exact configuration of the heat exchangers and/or solar collectors could also be varied.

The above-described variations, and others which will be apparent to the reader skilled in the art, should be considered within the spirit and scope of the following claims.

What is claimed is:

1. A solar chimney, comprising:
   a) an elongated chamber having an inlet and an outlet, the chamber defining a path for fluid flow from the inlet to the outlet,
   b) the chamber having diameter which decreases from the inlet to a throat portion, and wherein the diameter increases from the throat portion towards the outlet portion,
   c) means for heating air in the chamber by solar energy, and
   d) an exhaust wind turbine for providing suction in a direction which tends to draw air in the chamber towards the outlet,
   further comprising a vertical axis wind turbine, the vertical axis wind turbine being mounted in a vicinity of the outlet of the chamber, and being mounted to rotate relative to the chamber,
   wherein the vertical axis wind turbine is connected to an air compressor, wherein rotation of the vertical axis wind turbine causes the air compressor to operate, and wherein the air compressor is connected to drive an air-driven motor which is connected to operate the exhaust wind turbine.

2. The solar chimney of claim 1, further comprising a plurality of first vanes, mounted to the solar chimney, the first vanes being extendable and retractable, wherein the first vanes, in their extended positions, comprise means for deflecting air towards the vertical axis wind turbine.

3. The solar chimney of claim 1, further comprising a wind turbine disposed inside the chamber, the wind turbine being connected to an electric generator, wherein rotation of the wind turbine generates electric power.

4. The solar chimney of claim 1, wherein the solar heating means comprises a solar collector and a heat exchanger, the heat exchanger being disposed within the chamber so as to heat surrounding air.

5. The solar chimney of claim 4, wherein the solar collector is located outside the chimney, and wherein the solar collector is connected to transfer heat to the heat exchanger.

6. The solar chimney of claim 1, wherein the vertical axis wind turbine comprises a rotating cylindrical cage which is attached concentrically to the chimney, the cage including a plurality of second vanes which can move from a retracted position to an extended position in accordance with a direction of movement of wind from a surrounding environment.

7. The solar chimney of claim 6, wherein the second vanes are connected to shock absorbers which dampen movement of the second vanes between said retracted position and said extended position.

8. The solar chimney of claim 1, further comprising means for storing compressed air produced by the compressor.

9. A solar chimney, comprising:
   a) an elongated chamber having an inlet end and an outlet end, the chamber defining a path for fluid from the inlet end to the outlet end, the chamber having a diameter which becomes progressively smaller with distance from the inlet end, and which then becomes progressively larger towards the outlet end,
   b) means, located within the chamber, for heating air within the chamber by solar energy,
   c) an exhaust wind turbine, located in a vicinity of the outlet end of the chamber, the exhaust wind turbine comprising means for drawing air through the chamber from the inlet end to the outlet end, and
   d) a vertical axis wind turbine located in a vicinity of the outlet end of the chamber, the vertical axis wind turbine being mounted for rotation relative to the chamber, the vertical axis wind turbine comprising means for producing mechanical energy from wind in an outside environment of the chamber, and means for storing said mechanical energy for use in driving the exhaust wind turbine.

10. The solar chimney of claim 9, further comprising a plurality of vanes or flaps mounted around an exterior surface of the chamber and located in a vicinity of the outlet end, the vanes or flaps being retractable and extendable, the vanes or flaps comprising means for deflecting air towards the vertical axis wind turbine.

11. The solar chimney of claim 9, further comprising a wind turbine disposed inside the chamber, the wind turbine being connected to an electric generator, wherein rotation of the wind turbine generates electric power.

12. The solar chimney of claim 9, wherein the vertical axis wind turbine comprises a cage mounted for rotation relative to the chamber, wherein the vertical axis wind turbine includes a plurality of vanes which can move from a retracted position to an extended position in accordance with a direction of movement of wind from a surrounding environment.

13. A solar chimney, comprising:
   a) an elongated chamber having an inlet end and an outlet end, wherein the chamber has a general configuration of an hourglass,
   b) a turbine disposed within the chamber, the turbine being connected to an electric generator, wherein rotation of the turbine by air flowing in the chamber causes the generator to produce electric power, and
   c) means for heating air in the chamber with solar energy,
   further comprising an exhaust wind turbine, the exhaust wind turbine comprising means for drawing air from the inlet end towards the outlet end,
   further comprising a vertical axis wind turbine, the vertical axis wind turbine comprising means for capturing energy from wind in an environment outside the chamber, and means for storing such wind energy, and
   wherein the vertical axis wind turbine is connected to drive an air compressor, and wherein the air compressor is connected to supply compressed air to an air motor which drives the exhaust wind turbine.

14. The solar chimney of claim 13, further comprising a plurality of vanes or flaps mounted around an exterior surface of the chamber and located in a vicinity of the outlet end, the vanes or flaps being retractable and extendable, the vanes or flaps comprising means for deflecting air towards the vertical axis wind turbine.

* * * * *